United States Patent [19]

Sugiura et al.

[11] Patent Number: 5,707,066
[45] Date of Patent: Jan. 13, 1998

[54] BOOT ASSEMBLY WITH ADAPTER

[75] Inventors: Yoshiaki Sugiura; Hiroshi Miyashita, both of Ogasa-gun, Japan

[73] Assignee: NOK Corporation, Tokyo, Japan

[21] Appl. No.: 565,585

[22] Filed: Nov. 30, 1995

[30] Foreign Application Priority Data

Dec. 2, 1994 [JP] Japan .................... 6-299571

[51] Int. Cl.⁶ .................................................. F16J 15/52
[52] U.S. Cl. .......................... 277/212 FB; 464/175; 464/905
[58] Field of Search ..................... 277/181, 183, 277/189, 212 FB; 464/173, 175, 905, 906

[56] References Cited

U.S. PATENT DOCUMENTS

| | | | |
|---|---|---|---|
| 4,167,860 | 9/1979 | Sakaguchi et al. | 464/905 |
| 4,224,806 | 9/1980 | Kobayashi | 464/905 |
| 4,369,979 | 1/1983 | Krude et al. | 464/175 |
| 4,403,781 | 9/1983 | Riemsceid | 464/175 |
| 4,493,676 | 1/1985 | Krude | 464/906 |
| 5,135,438 | 8/1992 | Poulin et al. | 464/905 |
| 5,334,096 | 8/1994 | Iwao | 464/906 |

FOREIGN PATENT DOCUMENTS

| | | |
|---|---|---|
| 2-56919 | 4/1990 | Japan . |
| 3-112128 | 11/1991 | Japan . |
| 3-112129 | 11/1991 | Japan . |
| 4-73624 | 6/1992 | Japan . |
| 6-53826 | 7/1994 | Japan . |
| 6-82439 | 11/1994 | Japan . |

*Primary Examiner*—Scott Cummings
*Attorney, Agent, or Firm*—Jacobson, Price, Holman & Stern, PLLC

[57] ABSTRACT

A boot assembly with adapter comprising a boot having elasticity and an adapter having relative rigidity. The boot is provided with a small diameter mount formed at one end to be fit over the outer circumference of the shaft, a connecting bead formed at the other end for connection to the adapter, and a body formed between the small diameter mount and the connecting bead. The adapter is provided with a large diameter mount formed at one end for connection to the joint and a connecting cavity formed at the other end and fitting with the connecting bead of the boot so as to surround the connecting bead. The connecting cavity of the adapter is provided with a bend formed with a step which protrudes outward in the radial direction and pressing against the inner circumferential of the connecting bead of the boot and a foldback connecting to the bend, formed folded back to the inner circumference of the bend, and folded over itself so that the front end is accommodated in the step. Even if the axial center of the shaft is inclined to the maximum with respect to the joint, it is possible to effectively prevent the body from being damaged by the front end of the adapter.

7 Claims, 5 Drawing Sheets

BOOT ASSEMBLY WITH ADAPTER

BACKGROUND OF THE INVENTION

1. Field of the Invention

The present invention relates to a boot assembly with an adapter for use for a joint, more particularly relates to a boot assembly with an adapter for use for a universal joint.

2. Description of the Related Art

A universal joint is used for example for a power transmission apparatus for transmitting drive power of an automobile engine to the driving wheels.

In a front engine, front drive (FF) car, the transmission and the differential are connected by a drive shaft to enable transmission of the drive power of the engine to the driving wheels, that is, the rear wheels. Accordingly, while the bending angle is small, the rotational speed becomes a high speed on a par with the engine rotational speed, so when designing the drive shaft, it becomes necessary to give consideration to the critical speed and other high speed rotation.

Further, in a front engine, rear drive car, since the engine is mounted in the front of the car and the rear wheels are the driving wheels, the drive shaft necessarily becomes long, so consideration must also be given to the bending of the shaft. That is, a long shaft easily bends and, further, once bent, becomes an unbalanced mass which aggravates the bending of the shaft and can invite shaft breakage.

Accordingly, the technique has been adopted of dividing a long drive shaft into, for example, two parts and supporting an intermediate portion by a center bearing support assembly so as to avoid the critical speed.

In the design of a car body, however, due to the need for securing space in the car interior, it is essential to keep the floor of the interior extremely low. As a result, a structure is adopted wherein the transmission is tilted backward, the differential is tilted forward, and the drive shaft connecting the two is made extremely low. That is, the transmission and the differential are not arranged on the same axis.

Therefore, in the past, use has been made of universal joints (Hooke's joints) at the connecting portions of the transmission and drive shaft of a front engine, rear drive car, the differential and drive shaft, and the divided parts of the drive shaft so to correct the bending of the shaft.

As shown in FIG. 1, the outer race 43 of the universal joint 41 is for example affixed to the transmission side, while the inner race 44 of the universal joint is affixed to the drive shaft 42. Further, a ball 45 is interposed between the outer race 43 and the inner race 44.

Due to this, even if the transmission, drive shaft, and differential are not arranged on the same axis, it is possible to transmit the rotation of the transmission through the drive shaft 42 to the differential.

To protect the outer race 43, inner race 44, and ball 45 constituting the universal joint from rainwater, mud, and the like, use has been made of the boot assembly with adapter 31 shown in Japanese Unexamined Utility Model Publication (Kokai) No. 2-56919 and FIG. 1. The boot assembly with adapter 31 is comprised of an adapter 32 and boot 35.

The boot 35 is comprised of a rubber material or an elastic plastic material and in the mounted state has a half cross-section of a U-shape. The small diameter mount 36 at one end fits over the drive shaft 42 and is fastened by a band 46. The connecting bead 37 at the other end is formed larger in thickness.

The adapter 32 is made of metal and has a half cross-section of an L-shape. The large diameter mount 33 at one end is formed in a flange shape so as to allow mounting to the outer race 43 of the joint. The connecting cavity 34 at the other end is formed by bending inward and surrounds the connecting bead 37 of the boot. The connecting cavity 34 has a shock absorbing member 38 adhered to its inner side so as to ease impacts with the boot 35.

The air-tightness inside the boot is maintained by the boot assembly with adapter 31. As a result, it is possible to protect the universal joint from rainwater, mud, etc. Further, a boot used for a drive shaft etc. is required to have durability with respect to high speed rotation and enough of a heat resistance to withstand the effects of the heat produced at the coupling rather than a flexibility, so if use is made of a boot supported by an adapter, it is possible to prevent the boot from expanding even if the air in the boot expands.

Since a constant velocity joint 41 rotates at a high speed, however, the large diameter side of the boot is subjected to a massive centrifugal force. Therefore, by using the adapter 32 to connect the boot 35 to the large diameter portion of the joint 41, it is possible to make the connecting cavity 34 of the boot 35 and the adapter 32 as small in diameter as possible and to minimize the centrifugal force acting on the boot 35.

If however a shock absorbing member 38 is adhered to the inner side of the small diameter connecting cavity 34, however, there is the problem that the degree of freedom of the angle of inclination of the shaft 42 is restricted.

Further, when the shaft 42 is inclined with respect to the joint 41, the shock absorbing member 38 will abut against the boot 35, so the shock absorbing member 38 may detach and fall off. If the shock absorbing member 38 detaches and falls off, the boot 35 will contact the adapter 32, which may lead to damage to the boot.

Further, with long term use, the connecting cavity 34 of the adapter 32 will open, so the front end will abut against the boot 35 and may damage the boot 35.

SUMMARY OF THE INVENTION

The present invention was made in consideration of the above situation and has as its object to provide a boot assembly with adapter which prevents the connecting cavity of the adapter from damaging the boot and does not decline in connecting force with the boot even if the connecting cavity is subjected to force acting from the boot connecting bead.

To achieve the above object, according to a first aspect of the present invention, there is provided a boot assembly with adapter provided with a boot having elasticity and an adapter having relative rigidity, the boot being provided with a small diameter mount formed at one end to fit over the outer circumference of the shaft, a connecting bead formed at the other end for connecting with the adapter, and a body formed between the small diameter mount and the connecting bead, the adapter being provided with a large diameter mount formed at one end for connection to the joint and a connecting cavity formed at the other end to fit with the connecting bead of the boot so as to surround the connecting bead, the connecting cavity of the adapter being provided with a bend formed with a step which protrudes outward in the radial direction and pressing against the inner circumferential surface of the connecting bead of the boot and a foldback connecting to the bend, formed folded back to the inner circumferential surface of the bend, and folded over itself so that the front end is accommodated in the step.

Preferably a depression formed by squeezing is formed at the outer circumferential surface of the connecting cavity of the adapter for affixing with the connecting bead of the boot.

Preferably a groove corresponding to the shape of the bend of the adapter is formed in the inner circumferential surface of the connecting bead of the boot.

Preferably the front end of the foldback is formed to further fold back over itself in the space between the bend and the foldback.

According to a second aspect of the present invention, there is provided a boot assembly with adapter provided with a boot having elasticity and an adapter having relative rigidity, the boot being provided with a small diameter mount formed at one end to fit over the outer circumference of a shaft, a connecting bead formed at the other end to connect with the adapter, and a body formed between the small diameter mount and the connecting bead, the adapter being provided with a large diameter mount formed at one end for connection to the joint and a connecting cavity formed at the other end and fitting with the connecting bead of the boot so as to surround the connecting bead, the connecting cavity of the adapter being provided with a bend pressing against the inner circumferential surface of the connecting bead of the boot and a foldback connecting to the bend, formed folded back along the inner circumferential surface of the bent portion, and formed to fold over itself so that the front end extends from the inner circumferential surface of the bend along the bent surface of the connecting cavity up to the middle of the bent surface. Preferably the bend of the connecting cavity of the adapter has a step which protrudes outward in the radial direction.

According to a third aspect of the present invention, there is provided a boot assembly with adapter provided with a boot having elasticity and an adapter having relative rigidity, the boot being provided with a small diameter mount formed at one end to be fit over the outer circumference of a shaft, a connecting bead formed at the other end for connection to the adapter, and a body formed between the small diameter mount and the connecting bead, the adapter being provided with a large diameter mount formed at one end for connection to the joint and a connecting cavity formed at the other end and fitting with the connecting bead of the boot so as to surround the connecting bead, the connecting cavity of the adapter being provided with a bend pressing against the inner circumferential surface of the connecting bead of the boot and a foldback connecting to the bend formed folded back along the inner circumferential surface of the bend and with a front end bent to abut perpendicularly with the surface of the bend.

According to the present invention, since the assembly is configured so that the front end of the adapter abuts against the bend and is not exposed to the outside, so even if the axial center of the shaft is inclined to the maximum with respect to the joint, it is possible to effectively prevent the body from being damaged by the front end of the adapter. For example, even if abutting, it abuts against the bend, so the effect of prevention of damage by the bent surface can be expected.

Further, according to the present invention, the connecting cavity of the adapter is configured as a reinforcing structure using the bend and foldback and the connection with the step of the front end. As a result, it is possible to effectively prevent the connection with the connecting bead of the boot from becoming poor and weakening the connecting force.

Still further, according to the present invention, it is possible to provide a bend and foldback to grasp the connecting bead of the boot so that when squeezing to form the depression from the outside, the front end of the foldback is joined to the step so that sufficient squeezing becomes possible. Accordingly, it is possible to effectively prevent the occurrence of defects in the squeezing process.

Further, according to the boot assembly with adapter with the front end of the foldback bent along the bent surface of the bend, the bent surface acts to prevent damage to the boot. Further, since the front end of the foldback follows the bent surface, the effect can be expected that it reinforces the support of the bent surface side of the bend and strongly supports the connecting bead of the boot.

BRIEF DESCRIPTION OF THE DRAWINGS

These and other objects and features of the present invention will be clarified from the following description of the preferred embodiments given with reference to the attached drawings, in which.

DESCRIPTION OF THE PREFERRED EMBODIMENTS

Figure 1:
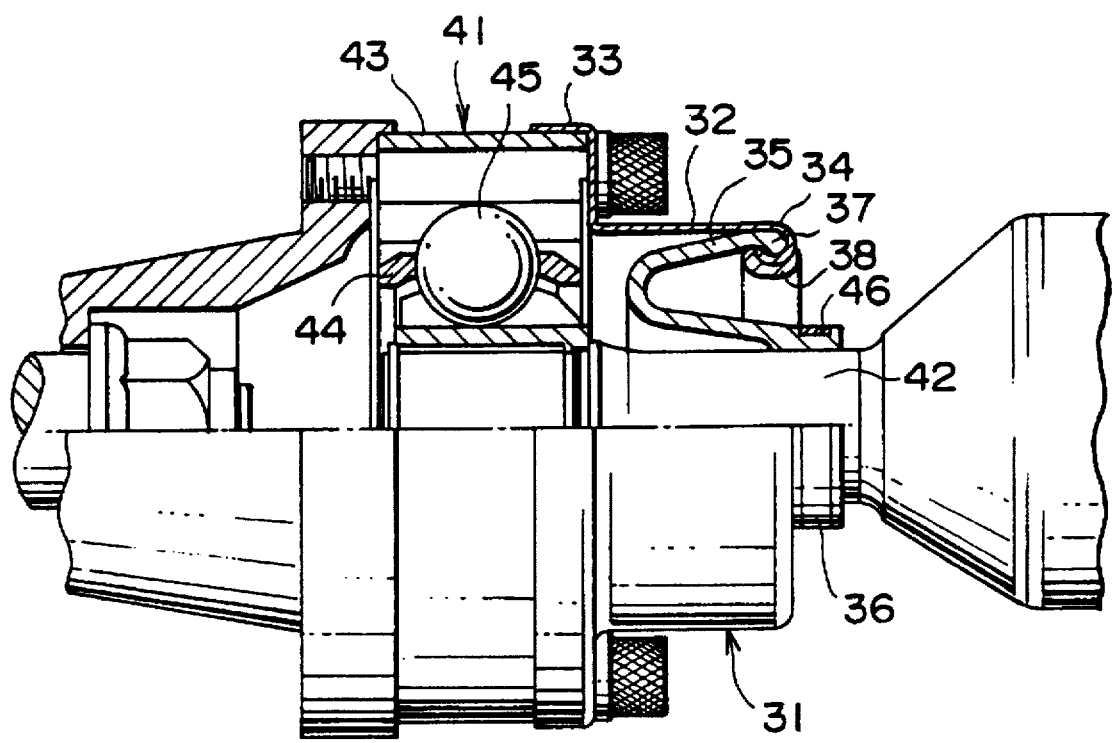
FIG. 1 is a cross-sectional view of a boot assembly with adapter of the related art.
Figure 2:
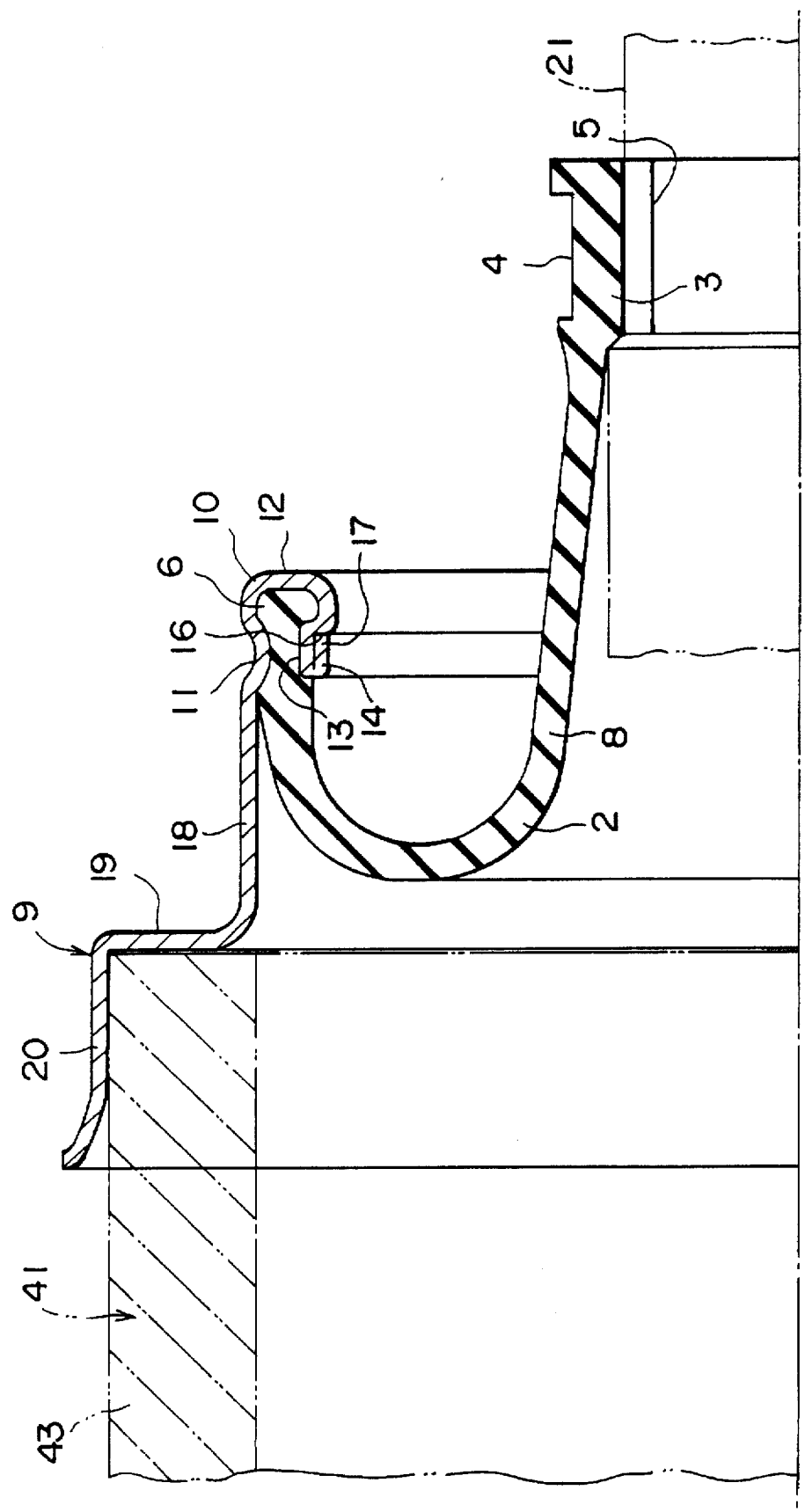
FIG. 2 is a cross-sectional view of a boot assembly with adapter according to a first embodiment of the present invention.

As shown in FIG. 2, the boot assembly with adapter according to a first embodiment of the present invention is used for protecting a universal joint 41 shown in FIG. 1, for example, and is provided with a boot 2 and an adapter 9.

The boot 2 of this embodiment is provided with a small diameter mount 3 formed at one end, a connecting bead 6 formed at the other end, and a body 8 of a U-shaped half cross-section formed integrally between them.

The small diameter mount 3 at one end of the boot 2 is provided with a band groove 4 in its outer circumference and is provided with a close fitting inner surface 5 for fitting over the shaft 21 at its inner circumference. A band is fit in the mounting groove 4 to make the small diameter mount 3 of the boot 2 closely adhere to the outer circumference of the shaft 21 and make the inside of the boot 2 air-tight. Note that the shaft 21 is in sliding contact with the inner circumference of the small diameter mount 3 of the boot 2 and can rotate freely.

In this embodiment, the connecting bead 6 of the other end of the boot 2 is formed thicker than the body 8. By fitting the relatively thicker connecting bead 6 in the substantially U-shaped cross-sectional connecting cavity 10 of the adapter 9, a strong connection becomes possible.

The boot 2 may be comprised of a rubber material or an elastic plastic. The rubber material or elastic plastic which can be used to make the boot 2 is not particularly limited, but one of a tensile modulus of 100 to 1000 kg/cm$^2$ and a hardness Hs of at least 70 is preferred. As the rubber material comprising the boot 2, chloroprene rubber (CR) or vinylmethyl silicone rubber is suitable. Further, as the elastic plastic, a polyester thermoplastic elastomer, polyurethane thermoplastic elastomer, polyamide thermoplastic elastomer, polystyrene thermoplastic elastomer, etc. are suitable. Further, as the method for making the boot 2, mention may be made of compression molding, injection molding, blow molding, etc. The molding method is selected according to the shape of the boot and the required dimensional precision. When the shape is simple, use is made of injection molding, which is superior in terms of dimensional precision, but in the case of a shape where the step of withdrawing the mandrel is difficult, blow molding is used.

The adapter 9 for connecting to the connecting bead 6 of the boot 2 is comprised of a ring-shaped member made of a metal such as a material corresponding to ASTM A 366/A, ATSM A 366H-91, or the like. The adapter 9 is provided at one end with a connecting cavity 10 for gripping the connecting head 6 of the boot formed by bending in a substantially U-shaped cross-section. The connecting cavity 10 is provided at its outer circumference with a depression 11 formed by squeezing. Further, the connecting cavity 10 is provided with a bent surface 12 bent to an approximately semi-circular or U-shaped cross-section. The bent front end of the connecting cavity 10 is formed with a bend 13 so that a step 16 protruding outward in the radial direction is formed. The outer circumference of the bend 13 presses against the inner circumference of the connecting bead 6 of the boot 2. The front end of the bend 13 is folded back to the inside to form the foldback 14. This foldback 14 is superposed over the step 16 formed at the bend 13 and is joined so that the end face of the front end 17 is accommodated in the step 16 and is not exposed to the outside.

Figure 6:
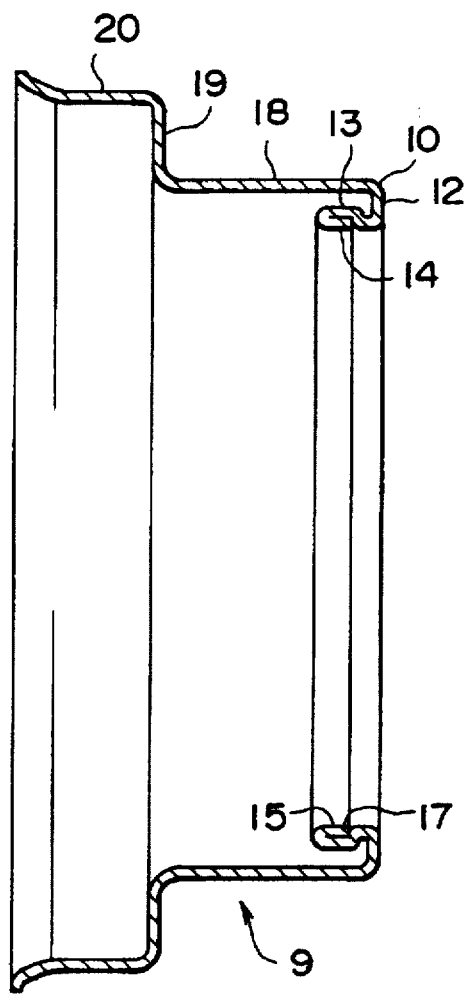
FIG. 6 is a cross-sectional view of the boot assembly with adapter shown in FIG. 2.

FIG. 6 is a cross-sectional view of the adapter 9. The adapter 9 is provided with a cylindrically shaped support 18 formed integrally with the connecting cavity 10. At the end at the side opposite to the connecting cavity of the support 18 is integrally formed a flange 19 flaring outward in the radial direction. At the outer circumference of the flange 19 is formed a cylindrically shaped large diameter mount 20. The large diameter mount 20, as shown in FIG. 2, is affixed to the outer race 43 of the joint 41. This is done by bolting the flange 19 to the outer race 43 or squeezing the cylindrically shaped large diameter mount 20 to the depression in the outer circumference of the outer race 43. In this embodiment, the adapter 9 is formed by pressing a metal ring-shaped member several times.

Figure 8:
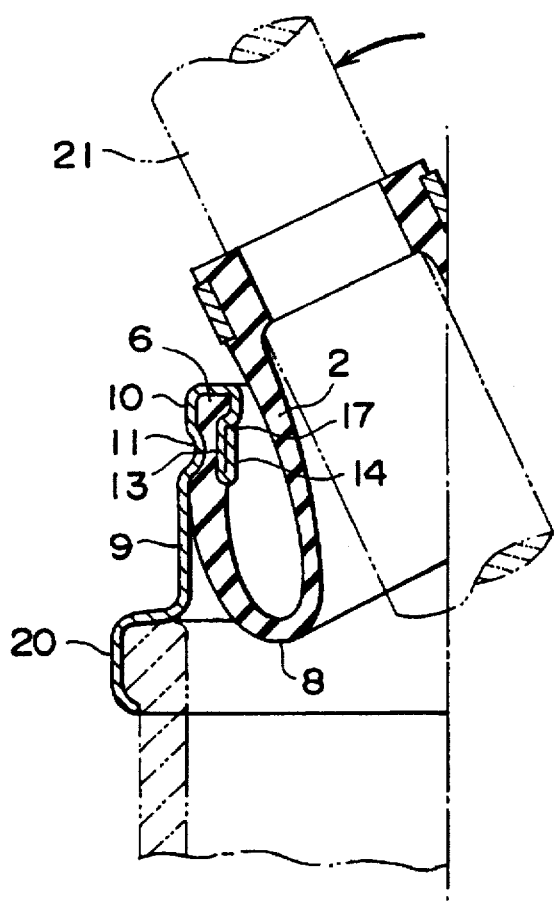
FIG. 8 is a half cross-sectional view of the state of actuation of the boot assembly with adapter shown in FIG. 2.

FIG. 8 is a half cross-sectional view of the state with the joint angle at an incline during actuation of the boot assembly with adapter according to this embodiment. As clear from the illustration, the film portion 8 of the boot 2 will not abut against the front end 17 of the foldback 14 even if the joint angle becomes maximum.

Further, during actuation, the front end 17 of the connecting cavity 10 of the adapter 9 will not be exposed outward and the bend 13 will not deform and open. Further, by inclining the axial center of the shaft 21 with respect to the axial center of the joint 1, even if the end of the bend 13 approaches the body 8 of the boot 2, almost no damage is seen near the connecting bead 6 of the boot or the body 8 of the boot.

That is, according to the present invention, since the front end 17 of the foldback of the adapter 9 is made to abut against the bend 13 so as not to be exposed to the outside, even if the axial center of the shaft 21 is inclined to the maximum with respect to the joint, it is possible to effectively prevent the body 8 from being damaged by the front end of the adapter 9. Even if abutting, it abuts against the bent surface 12, so the effect of preventing of damage by the bent surface can be expected.

Further, according to this embodiment, the connecting cavity 10 of the adapter 9 is configured as a reinforcing structure using the bend 13 and foldback 12 and the connection with the step 16 of the front end 17. As a result, it is possible to effectively prevent the connection with the connecting bead 6 of the boot 2 from becoming poor and weakening the connecting force.

Still further, according to the present invention, it is possible to provide a bend 13 and foldback 14 to grasp the connecting bead 6 of the boot 2 so that when squeezing to form the depression from the outside, the front end of the foldback 14 is joined to the step 16 so that sufficient squeezing becomes possible. Accordingly, it is possible to effectively prevent the occurrence of defects in the squeezing process.

Note that the present invention is not limited to the above embodiment and that various modifications are possible within the scope of the invention.

Figure 3:
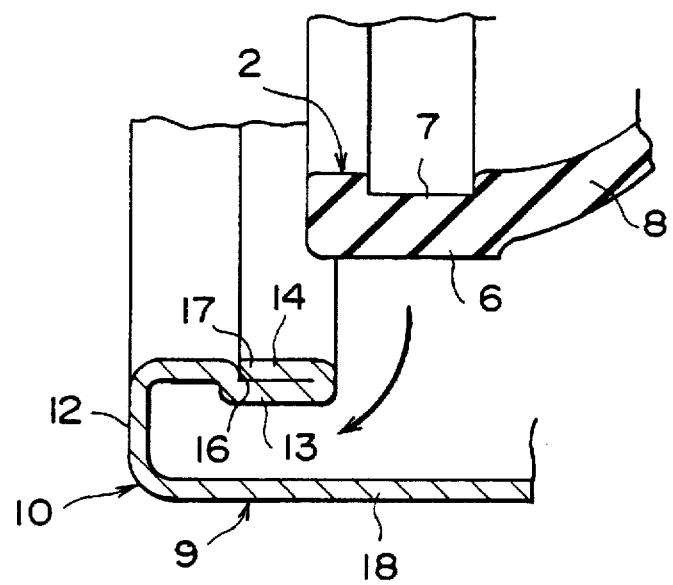
FIG. 3 is a cross-sectional view of key portions of the connecting bead of the boot assembly with adapter according to another embodiment of the present invention.

For example, in the above embodiment, the shape of the connecting bead 6 of the boot 2 was that shown in FIG. 2, but the invention is not limited to this. As shown in FIG. 3, it is also possible to provide a groove 7 corresponding to the shape of the bend 13 at the inner circumference of the connecting bead 6 of the boot 2 so as to further strengthen the connection with the adapter 9. Further, the thickness of the connecting bead 6 is not necessarily greater than the body 8 and may be substantially the same as the body 8.

Figure 4:
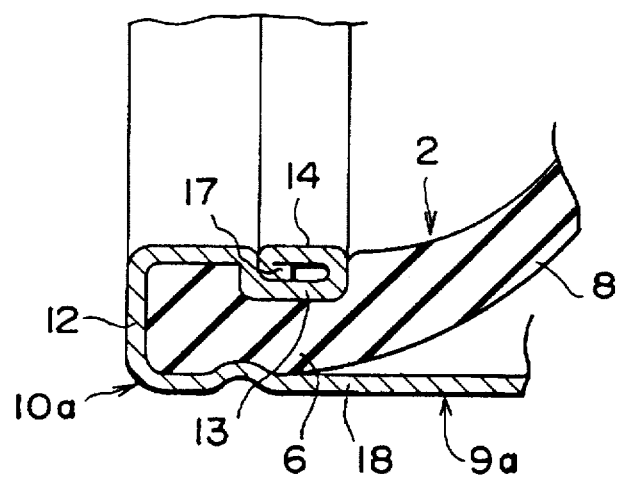
FIG. 4 is a cross-sectional view of key portions of the boot assembly with adapter of another embodiment of the present invention.

Further, as another embodiment of the present invention, as shown in FIG. 4, the front end 17 of the foldback 14 formed at the connecting cavity 10a of the adapter 9a may be formed so as to be folded back over itself in the space between the bend 13 and the foldback 14.

Figure 5:
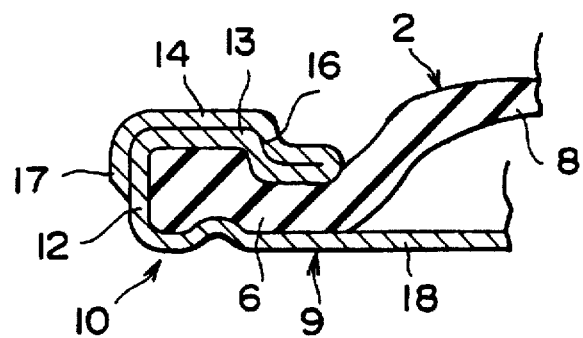
FIG. 5 is a cross-sectional view of key portions of the boot assembly with adapter of another embodiment of the present invention.

Further, as another embodiment of the present invention, as shown in FIG. 5, it is possible to form the front end 17 of the foldback 14 to ride over the step 16 from the inner circumference of the bend 13, follow along the bent surface 12 of the connecting cavity 10, and reach the middle of the bent surface 12.

In this way, according to the boot assembly with adapter with the front end 17 of the foldback bent along the bent surface of the bend 13, the bent surface acts to prevent damage to the boot. Further, since the front end 17 of the foldback 14 follows along the bent surface, the effect can be expected that it reinforces the support of the bent surface side of the bend 13 and strongly supports the connecting bead of the boot 2.

Figure 7:
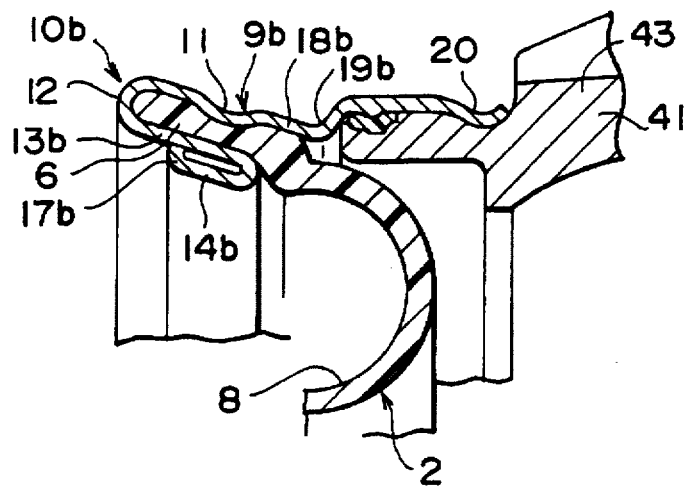
FIG. 7 is a cross-sectional view of the connecting cavity of a boot assembly with adapter according to another embodiment of the present invention.

FIG. 7 is a cross-sectional view of key portions of a boot assembly with adapter according to another embodiment of the present invention.

In FIG. 7, the adapter 9 of the boot assembly with adapter according to this embodiment is formed to a special shape so as to increase the joint angle of the shaft. That is, the flange 19 shown in FIG. 6 is made smaller and the short flange 19b shown in FIG. 7 is formed continuous with the large diameter mount 20. Further, in this embodiment, the length of the support portion 18b in the axial direction is also shortened.

In this embodiment, the front end 17b of the foldback 14b is bent to abut perpendicularly with the surface of the bend 13b. This is because the support portion 18b is formed to taper off toward the end and therefore will not abut against the body 8 of the boot 2 even if bent to be perpendicular with the bend 13b.

Note that in the embodiments shown in FIGS. 3, 4, 5, and 7, members common with the embodiment shown in FIG. 2 are given the same reference numerals and explanations thereof are omitted.

Further, the boot assembly with adapter according to the present invention is not limited to protection of the universal joint shown in FIG. 1 and may be widely used for protecting universal joints of other constructions and joints other than universal joints.

We claim:

1. A boot assembly with an adapter comprising a boot having elasticity and an adapter having relative rigidity, the boot comprising:
   - a small diameter mount formed at one end of the boot to fit over the outer circumference of a shaft,
   - a connecting bead formed at the other end of the boot for connecting with the adapter, and
   - a body formed between the small diameter mount and the connecting bead, the adapter comprising:
   - a large diameter mount formed at one end of the adapter for connection to a joint, and
   - a connecting cavity formed at the other end of the adapter fit with the connecting bead of the boot so as to surround the connecting bead, a connecting cavity of the adapter comprising:
   - a bend formed with a step which protrudes outward in the radial direction and presses against the inner circumferential surface of the connecting bead of the boot, and
   - a foldback connecting to the bend and having a front end, the foldback formed folded back along the inner circumferential surface of the bend, and folded over the inner circumferential surface of the bend so that the front end of the foldback meets flush with the step.

2. The boot assembly with adapter as set forth in claim 1, wherein a depression formed by squeezing is formed at the outer circumferential surface of the connecting cavity of the adapter for affixing with the connecting bead of the boot.

3. The boot assembly with adapter as set forth in claim 1, wherein a groove corresponding to the shape of the bend of the adapter is formed in the inner circumferential surface of the connecting bead of the boot.

4. The boot assembly with adapter as set forth in claim 1, wherein the front end of the foldback is formed to further fold back over itself in the space between the bend and the foldback.

5. A boot assembly with an adapter comprised of a boot having elasticity and an adapter having relative rigidity, the boot comprising:
   - a small diameter mount formed at one end to fit over the outer circumference of a shaft,
   - a connecting bead formed at the other end to connect with the adapter, and
   - a body formed between the small diameter mount and the connecting bead, the adapter comprising:
   - a large diameter mount formed at one end of the adapter connection to a joint, and
   - a connecting cavity having a bent surface formed at the other end of the adapter and fitting with the connecting bead of the boot so as to surround the connecting bead, the connecting cavity of the adapter comprising:
   - a bend pressing against the inner circumferential surface of the connecting bead of the boot, and
   - a foldback connecting to the bend, formed folded back along the inner circumferential surface of the bend, and formed to fold over itself so that the front end extends from the inner circumferential surface of the bend along the bent surface of the connecting cavity up to the middle of the bent surface.

6. The boot assembly with adapter as set forth in claim 5, wherein the bend of the connecting cavity of the adapter has a step which protrudes outward in the radial direction.

7. A boot assembly with an adapter comprised of a boot having elasticity and an adapter having relative rigidity, the boot comprising:
   - a small diameter mount formed at one end to be fit over the outer circumference of a shaft,
   - a connecting bead formed at the other end for connection to the adapter, and
   - a body formed between the small diameter mount and the connecting bead, the adapter comprising:
   - a large diameter mount formed at one end for connection to a joint and
   - a connecting cavity formed at the other end and fitting with the connecting bead of the boot so as to surround the connecting bead, the connecting cavity of the adapter comprising:
   - a bend pressing against the inner circumferential surface of the connecting bead of the boot, and
   - a foldback connecting to the bend formed folded back along the inner circumferential surface of the bend and with a front end bent to abut perpendicularly with the surface of the bend.

* * * * *